United States Patent [19]

Nordberg et al.

[11] Patent Number: 4,921,613
[45] Date of Patent: May 1, 1990

[54] METHOD FOR PURIFYING RESIN-CONTAINING WASTE LIQUOR IN THE MANUFACTURE OF CELLULOSE PULPS

[75] Inventors: Cecilia M. Nordberg, Örnsköldsvik; Thomas B. Engström, Vallakra; Thomas Pinzke, Helsingborg; Owe Sänneskog, Helsingborg; Jan Öhlund, Helsingborg, all of Sweden

[73] Assignee: Boliden Aktiebolag, Stockholm, Sweden

[21] Appl. No.: 288,932

[22] Filed: Dec. 23, 1988

[30] Foreign Application Priority Data

Dec. 23, 1987 [SE] Sweden ............................ 8705141

[51] Int. Cl.$^5$ ............................................. C02F 1/24
[52] U.S. Cl. ..................................... 210/651; 210/705; 210/710; 210/712; 210/725; 210/727; 210/738; 210/928; 162/16
[58] Field of Search ............... 210/928, 703, 705, 710, 210/725, 727, 738, 255, 651; 162/16, 29, 41, 42, 60

[56] References Cited

U.S. PATENT DOCUMENTS

| | | | |
|---|---|---|---|
| 1,442,306 | 1/1923 | Stonebraker | 210/255 |
| 2,382,010 | 8/1945 | Hodges | 210/928 |
| 3,200,949 | 8/1965 | Aulich et al. | 210/726 |
| 3,666,663 | 5/1972 | Walker | 210/738 |
| 3,977,967 | 8/1976 | Trulson et al. | 210/651 |
| 4,089,780 | 5/1978 | Svarz et al. | 162/16 |
| 4,559,146 | 12/1985 | Roets | 210/705 |
| 4,724,045 | 2/1988 | Ackel | 210/928 |
| 4,738,750 | 4/1988 | Ackel | 210/703 |

Primary Examiner—Peter Hruskoci
Assistant Examiner—Krisanne Shideler
Attorney, Agent, or Firm—Sughrue, Mion, Zinn, Macpeak & Seas

[57] ABSTRACT

The present invention solves the problem of managing resin-containing waste liquors within the cellulose pulp industry. The invention relates to a method for purifying resin-containing waste liquor in the manufacture of cellulose pulp, in which method a pH-adjusting chemical is, when necessary, added to resin-containing waste liquor removed from the cellulose pulps, so that the pH of the waste liquor will lie within the pH range 1-7, and in which a water-soluble organic polymer is added to the waste liquor in the form of a forwardly moving liquid stream. The method is characterized by dividing up the requisite amount of polymer into part quantities which are introduced into the liquid stream on at least two occasions, by subjecting the liquid stream to a pronounced shearing and/or turbulent treatment process, and by subsequently separating agglomerated resin from the waste liquor.

14 Claims, 1 Drawing Sheet

METHOD FOR PURIFYING RESIN-CONTAINING WASTE LIQUOR IN THE MANUFACTURE OF CELLULOSE PULPS

TECHNICAL FIELD

The present invention relates to a method for purifying resin-containing waste liquor in the manufacture of cellulose pulp. The invention is intended for application with waste liquors deriving from all known pulp manufacturing methods, which methods, for instance, can be divided into three categories designated chemical, chemimechanical and mechanical pulping methods. The invention is also particularly suitable for application with waste liquors which derive from the chemical pulp manufacturing industry, e.g. from sulphite plants. Chemithermomechanical pulp (CTMP) can be mentioned as an example of the remaining pulps with which the invention can be applied during their manufacture.

BACKGROUND PRIOR ART

Cellulose pulp is normally manufactured from lignocellulosic starting materials, such as different types of wood for example.

Wood contains resin in proportions which vary with the type of wood concerned. The presence of mentioned resin has created problems for the pulp manufacturer and/or pulp consumer, irrespective of which pulp manufacturing method is used and irrespective of the type of wood from which the pulp is manufactured. For instance, if paper pulp is produced and the pulp in its final state contains excessive resin, problems will immediately occur in the paper manufacturing process, i.e. in the paper mill. Consequently, there is a general endeavour on the part of pulp manufacturers to remove as much resin as possible from the pulp. In practice, these manufacturers apply with respect to the resin content of different pulps certain guidelines which must not be overstepped. In the majority of cases there is a desire to reduce the pulp resin content to as near to zero as possible. The viscose pulp sector, however, is one exception from the view that resin in pulp will always have a detrimental effect, since it has been found that when using such pulps in the manufacture of viscose, a given low resin content (0.10–0.20% DKM) is beneficial. However, it is necessary to remove the major part of the resin contained in pulp, even when manufacturing viscose pulp, and furthermore the removal of resin in this case is controlled so that said contents will constantly lie within the aforesaid range.

The manner in which the resin leaves the wood and later the cellulose pulp will vary with the method of pulp manufacture required.

In the manufacture of chemical pulp, for instance, part of the resin is released during the actual digestion process and is removed from the pulp when the pulp is washed and screened. The resin content of the pulp is finally adjusted in the bleaching department. It is primarily in the alkali stage (E) of the bleaching process that resin is removed. (ormally, oxygen bleaching (O) will also result in a reduction in the amount of resin contained by the pulp. The final adjustment of the resin content is often effected with the aid of a bleaching agent, for instance chlorine dioxide (D).

When manufacturing high yield pulps, such as for instance groundwood pulps, refiner pulps (thermomechanical pulps) and chemithermomechanical pulps, where the wood is not digested, it is to rely primarily on the bleaching chemicals, e.g. peroxides (P), for the removal of resin from pulp.

The resin problem still remains unsolved even when the major part of the resin present in the pulp is removed therefrom, since the resin is only shifted from the pulp to one or more of the waste liquors obtained when washing the pulp subsequent, e.g., to undergoing one of the aforesaid treatment stages. Waste liquors which contain high proportions of resin are always difficult to handle, due to the fact that the inherent properties of the resin present, inter alia its stickiness, which often leads to blockaging problems of one kind or another. Waste liquor which is rich in resin and is simply discharged to sewage, i.e. released to the recipient, constitutes a load on the environment. Furthermore, the resin thus released has an intrinsic value and can possibly be put to a useful purpose.

In other words, there has long been found a need for removing resin from different waste liquors if possible, and then preferably in the highest possible concentrated form.

Several solutions to this problem have been proposed in the literature, and some of these proposals are applied in practice. One commercially available method requires the waste liquor to be subjected to an ultra-filtration process and the resin concentrate to be subsequently treated in a manner to increase the dry solids content of the concentrate. This method works well in practice. It has been found, however, that a significant membrane area is required in order to achieve the desired resin increase in the concentrate, which involves significant investment costs and also considerable operating costs.

Another method is proposed in the European patent application Ser. No. 0 151 097, according to which a flocculating metal salt (e.g. aluminium sulphate) is added to the resin-containing waste liquor, optionally in combination with an organic polyelectrolyte, and the resultant flocculated product is isolated and thereafter added with a strong inorganic splitting acid to pH 2, or therebeneath, and split at a temperature of at least 70° C., whereafter the resin product split from said product is itself isolated and the resultant split metal sulphate solution is also isolated, this latter solution being recycled in the system if so desired.

Although this method works, it produces, inter alia, a sludge which is difficult to handle, if it cannot be burned separately.

A third method is found described in Japanese patent application No. 53-58002. This method relates to the purification of waste cooking liquor obtained in the manufacture of hardwood sulphite pulp from suspended material. The pH of the waste liquor is adjusted to a value within the range 2.5–5, whereafter a polyacrylamide type chemical is added and a temperature of 30°–70° C. is maintained. The suspended material precipitates out during the treatment process, to form a sediment.

This method is primarily intended for the purification of waste cooking liquors and it is not certain that the method can be applied to other waste liquors.

SUMMARY OF THE INVENTION

Technical problem

It will be apparent from the aforesaid that the problem of isolating resin from different waste liquors in the manufacture of cellulose pulp has not been fully solved and that there is a need for one or more methods by means of which resin can be removed effectively and inexpensively from waste liquor and which will preferably enable the final resin to be obtained at a high dry solids content.

Solution

The present invention provides a solution to this problem and relates to a method for purifying resin-containing waste liquors obtained in the manufacture of cellulose pulp, in which, when necessary, a pH-adjusting chemical is added to resin-containing waste liquor removed from the cellulose pulp, so that the pH of the liquor will lie within the range of 1-7 and in which a water-soluble organic polymer is added to the waste liquor, which has the form of a forwardly moving stream of liquid, characterized by dividing up the requisite amount of polymer and introducing said part amounts into the liquid stream on at least two occasions; subjecting the liquid stream to a pronounced shearing and/or turbulent treatment process; and then isolating agglomerated resin from the waste liquor.

The shearing and/or turbulent treatment process to which the waste liquor is subjected shall not be all too pronounced or all too moderate. If the process is too powerful the polymer resin mixture will be disintegrated, whereas if the process is too moderate the resin agglomerates will not be sufficiently large, thereby rendering it difficult to isolate the resin from the waste liquor. It has been found that this treatment process should be carried out at least partially in the presence of air or with the aid of air.

More precisely, the treatment process may comprise allowing the polymer-provided waste liquor to fall freely in air down into a tank, where the waste liquor is collected and/or by causing the waste liquor to pass over at least one spillway immediately upstream of or in the tank.

An advantageous result is obtained when the total amount of polymer added corresponds to at least one milligram per gram of bone-dry resin in the waste liquor. An advantage is also gained when the largest part of the divided polymer quantity is supplied to the liquid stream at the first addition location.

The polymer in question may comprise any water-soluble organic polymer of sufficient molecular weight, e.g. a molecular weight about 500 000. Examples of such polymers are polyimine, polyimide, polyacrylamide and polyethylene oxide. This latter chemical has been found particularly beneficial in the present context.

The time permitted for the polymer to react with resin present in the waste liquor is significant to the end result, meaning that at least five seconds shall pass between the first and the second polymer additions, and that the polymer is allowed to stay in the waste liquor for at least one second after the last polymer addition prior to subjecting the waste liquor to the next treatment process in line.

In order to achieve a good result at low polymer additions, it has been found that an advantage is gained when the waste liquor to be treated in accordance with the invention has a resin content which exceeds 5 grams of bone-dry resin per liter. If the waste liquor to be treated in accordance with the invention does not fulfil this requirement, the waste liquor should be treated in a manner to increase its resin content. One suitable method herefor is to ultra-filter the waste liquor so that the part of the liquor in which the resin remains has a resin content which exceeds the aforesaid threshold value.

Agglomerated resin can be isolated or separated from the waste liquor in any known manner. It has been found particularly advantageous, however, when the resin (the flotage) is separated from the waste liquor by means of flotation. This involves collecting the waste liquor, for instance, in a tank of given volumetric capacity and scraping the resin from the surface of the spent liquor volume, and conducting away part of the substantially resin-free liquor from the bottom of said liquor volume.

Preferably, part of the resin-free waste liquor is removed and air supplied to said removed liquor, whereafter this liquor is recycled to the newly introduced waste liquor in conjunction with adding the polymer to the fresh waste liquor. The remaining quantity of resin-free liquor is passed to a suitable location within the mill, for example, to a further purification stage, prior to releasing the practically totally purified waste liquor to the recipient for instance.

According to one preferred embodiment of the invention, the agglomerated resin (the flotage) which exhibits a dry substance content of 30-50%, is passed to a container provided with agitating means. Despite the high dry solids content of the resin, it is possible to convert the resin into a pumpable state, by vigorously agitating the resin, this pumpable state of the resin being preferred in the subsequent treatment of said resin. This conversion of the resin to a pumpable form is greatly facilitated when an alkali is added to the resin, which alkali may be of any known kind whatsoever, for instance sodium hydroxide. An amount as low as 0.1% alkali, calculated on the absolute dry weight of the resin, is sufficient for this purpose.

The resin is then pumped to a treatment stage, in which an inert chemical in powder form is added to the resin. Any known inert chemical whatsoever can be added. Preferably, however, the inert chemical used will be one which is already found and used in the pulp mill, for example in the chemical cycle. Sodium sulphate is an example of one such chemical. The treatment concerned is normally referred to as salting-out. Subsequent to the addition of an acid, which results in a lowering of the pH, the resin is passed to a final separation stage. Any known kind of separation methods can be used. It has been found, however, that a particular advantage is afforded when this separation of the resin is effected by centrifugation. By treating the resin recovered in the flotation process in the aforedescribed manner, it has been found possible to concentrate the resin to a dry solids content of at least 90%.

The total economy of the invention method is improved considerably when the resin is passed to a boiler, e.g. a soda recovery boiler, and there combusted. Resin of such high dry solids content will namely constitute a good substitute for fuel oil. If the resin is considered too valuable to be burned, it can be used within the mill as a base chemical or sold on the open market, e.g. to a tall oil plant.

Advantages

The inventive method leads to a plurality of important advantages.

Firstly, the method is extremely effective, i.e. it enables practically all of the resin present to be removed from the waste liquor. When the inventive method is applied to an optimal degree, the degree of resin separation from the waste liquor will be very close to 100%. As will be readily understood by all, when electing to transport part of the resin-free waste liquor, or the whole of said resin-free liquor, to, e.g., a further purification stage for the removal of substances isolated from resin, and thereafter transport the waste liquor to the recipient, the environmental circumstances are greatly improved in comparison with those circumstances when the waste liquor rich in resin is discharged directly to the waste outlet or drains.

Furthermore, the high degree of separation achieved with the invention is also advantageous when the resin is considered to constitute a valuable chemical, i.e. a chemical which an be used for useful purposes.

The high efficiency of the inventive method also results in low consumption of the single, absolutely necessary chemical, i.e. the organic polymer, which results in acceptable operation costs.

In addition, the fixed costs for installing the apparatus required for carrying out the inventive method are also comparatively low.

BRIEF DESCRIPTION OF THE DRAWING

The single FIGURE of the accompanying drawing is a flow sheet which illustrates a preferred embodiment of the imventive method.

DESCRIPTION OF A PREFERRED EMBODIMENT

Figure 1:
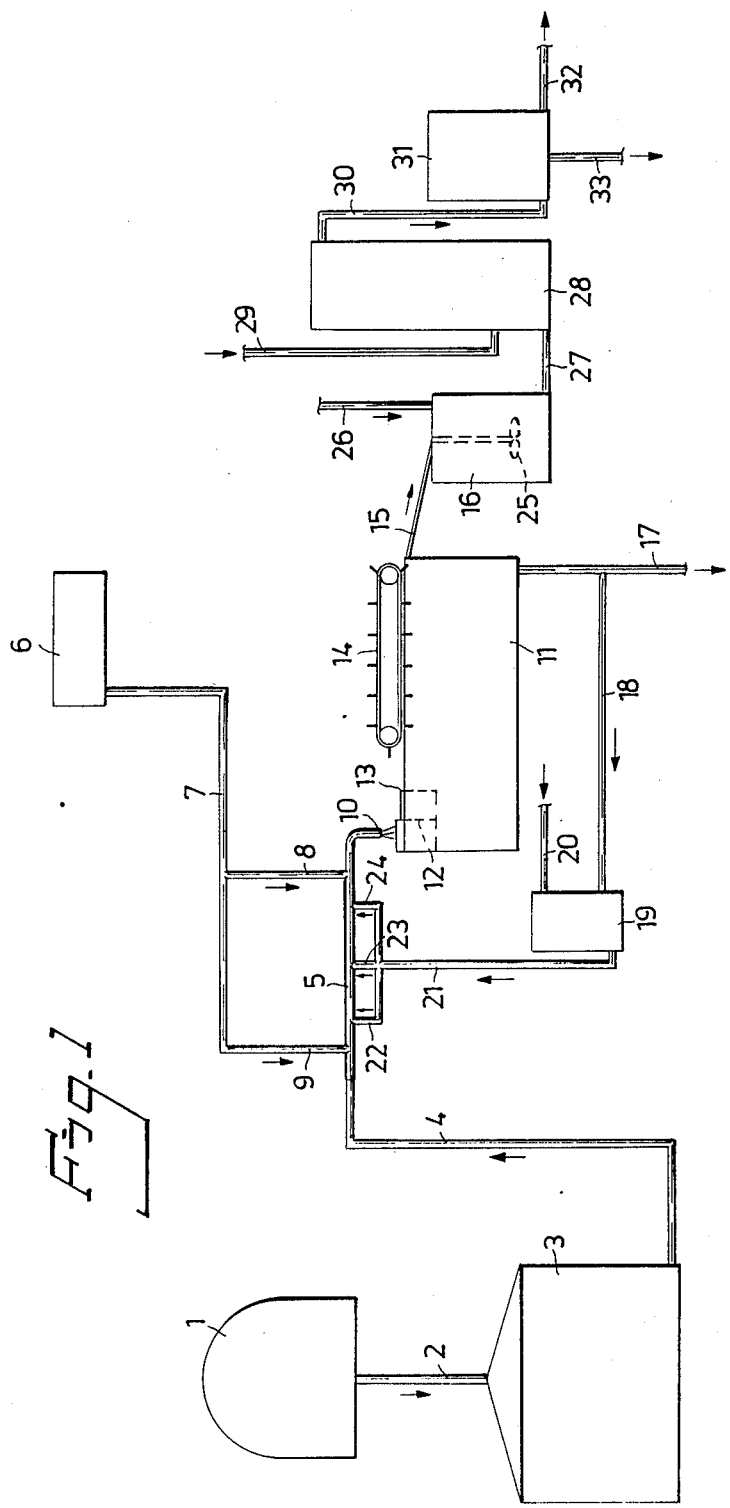

The inventive method will now be described with reference to a preferred embodiment thereof. In conjunction herewith alternative measures are described and a resumeé is given of a number of experiments carried out in the laboratory, where a number of important parameters were studied in connection with the inventive method.

In FIG. 1 of the accompanying drawing is a flow sheet which illustrates one embodiment of the invention, suitably for application in a sulphite mill when manufacturing bleached pulp with the bleaching sequence E-C-H-D. Prior to being introduced into the alkali tower (E), the pulp has been treated with alkali (sodium hydroxide) in a screw defibrator, for the purpose of freeing the pulp effectively from the major part of its resin content. Subsequent to remaining in the tower for a given stay period, the pulp is passed to a filter, on which the pulp is washed with a washing liquid. The resultant spent or waste liquor is passed in counterflow to the washing filter 1, which is located immediately upstream of the location in which the alkali-provided pulp is subjected to the aforesaid mechanical treatment. Prior to the pulp reaching the filter 1, the pulp is passed from the cooker to a diffuser and thereafter to the screening room. As before mentioned, the waste liquor deriving from the washing filter downstream of the alkali tower is passed in counterflow to the pulp on the filter 1, through the pulp web and down into the filtrate tank 3 through a conduit 2. Part of the filtrate, or waste liquor is taken from the filtrate tank 3 and passed in counterflow to the diffuser (not shown in the figure). Since the pulp suspension flowing from the cooker to the diffuser is highly acid (pH about 2) and the waste liquor, which repeatedly meets the pulp suspension in counterflow, is alkaline, there occurs a state of equilibrium such that the waste liquor present in the tank 3 will have a pH-value within the range of 5-6.

It has been found that a pH-value within this range is highly suitable with respect to the inventive method. Because the cellulose pulp is deresinated effectively by the aforesaid chemimechanical treatment process, the waste liquor deriving from the washing filter downstream of the alkali tower will have a high resin content. As before mentioned, the waste liquor is passed in counterflow and collected in the tank 3, whereby the resin content in this location of the system will also be high, for instance 10-20 g of bone-dry resin for each liter of waste liquor. The temperature in the tank is about 60° C., which means that when treated in accordance with the invention the waste liquor will have this temperature or a somewhat lower temperature by some degrees. Part of the waste liquor in question is passed to a tubular device 5, through a conduit 4. An organic polymer in powder form, preferably polyethylene oxide having a molecular weight of, e.g. about $8 \cdot 10^6$ is mixed with water in a chemical preparation stage 6, such that the polymer will pass into solution. Polyethylene oxide is dissolved in a concentration which lies within the range 0.05-0.20%. A concentration of 0.1% has been found particularly suitable. This solution is transported through a conduit 7 and part-conduits 8 and 9, and is introduced into the forwardly flowing resin-rich waste liquor at two addition locations. Good results have been achieved in practical tests when the waste liquor flowing in the tubular device 5 has a velocity such that transportation of the waste liquor between conduit 9 and the conduit 8 will take from 20 to 30 seconds and such that the transportation of the waste liquor from the conduit 8 to the end 10 of the tubular device will take from 1 to 10 seconds. This time range is contingent in part on the concentration of the polyethylene oxide. Higher concentrations will result in longer time intervals. The total amount of polymer added shall correspond to at least one milligram of polymer for each gram of bone-dry resin in the waste liquor. Although smaller amounts of polymer can be added, the addition of smaller amount will greatly reduce the extent to which the resin is separated from the waste liquor.

The aforedescribed arrangement will permit the polymer to react with the resin over a given period of time before the waste liquor is subjected to the next method step, namely a shearing and/or turbulent treatment process. Very good results have been achieved when the waste liquor is permitted to fall freely from the end 10 of the tubular device down through the air and into a tank 11. Only one tube end 10 has been shown in the figure. It has been found advantageous in practice to branch the tubular device 5 at its end in a manner to divide the waste liquor into a number of smaller flows which fall down into the tank 11 across the whole of its width. An advantage is also afforded when the collected waste liquor is caused to pass over two wires or spillways 12 and 13.

As a result of such treatment, the resin particles present in the waste liquor combine to form agglomerates which clearly separate from th*e remaining waste liquor and float to the surface thereof. This resin is then transported by means of a scraper arrangement 14, from the tank 11 to a container 16, via an outfeed arrangement 15.

Part of the resin-free waste liquor is removed from the bottom (not shown in the figure) of the tank 11 through conduits connected to said bottom. The liquor is taken from the tank 11 and removed through a conduit 17. Part of the liquor is conducted through a conduit 18 to a container 19. Air, for instance compressed air, is introduced into the container 19 through the conduit 20 and admixed with the liquor. This aerated liquor is then transported through the conduit 21 and introduced into the resin-rich waste liquor through three branch conduits 22, 23 and 24.

The major part of the liquor is transported through a main conduit 17 to an anaerobic purification apparatus for further purification, i.e, for removal of essentially other contaminants than resin. The liquor is discharged from this apparatus to the recipient, practically in the form of pure water.

The resin transported to the container 16 has a dry substance content of 30–50%. The resin can be converted to a pumpable form, with the aid of a propeller-like device 25. This process is greatly facilitated when 0.1% NaOH, calculated on bone-dry resin, is supplied in liquid form through a conduit 26. A strong caustic soda solution, e.g. containing 260 g NaOH per liter, can be used for this purpose.

The resin is pumped through the line 27 to a container 28, to which a slat ($Na_2SO_4$) in powder form is supplied through a conduit 29. A relatively large amount of salt is supplied, e.g. 10–30% calculated on the amount of bone-dry resin present. The addition is controlled in a manner such that subsequent to adding the salt, the mixture will have a density within the range of 1.05–1.25 g/cm$^3$. The resin-salt mixture is then pumped through the conduit 30 to a final separation stage having the form of a centrifuge 31. During its passage to the centrifuge 31, the resin-salt mixture (not shown in the figure) is acidified with an acid, e.g. sulfuric acid, down to a pH of about 3. In the final treatment stage 31 there is obtained a resin phase having a dry substance content in excess of 90%, which is removed through a conduit 32 and passed to the soda recovery boiler of the mill and used as a substitute for fuel oil, and also obtained is an acid liquid phase (containing the added salt in dissolved form) which is removed through the conduit 33 and passed to the evaporator plant of the mill.

Tests have been carried out in the above exemplified sulphite mill on a pilot-plant scale which, to a large extent, resemble the method described with referance to FIG. 1. Waste liquor having a pH of 5.6, a temperature of 62° C. and a resin content of 18.9 g per liter was removed from the filtrate tank 3 and transported through a conduit 4 to a tube 5. These tests were carried out for the purpose of investigating the extent to which varying flows (amounts) of waste liquor and varying additive quantities of polyethylene oxide (PEO) havng a molecular weight of about 8·10$^6$ would influence the degree of resin separation, i.e. how much resin calculated as a percentage is removed from the waste liquor in said separation process. These parameters are given in the following Table 1 and will be remarked upon with reference to the table.

Polyethylene oxide in the form of a 0.1-percent solution was supplied to the forwardly flowing stream of waste liquor on two occasions. The time lapse between charges was 26.5 seconds at the lowest rate of flow and 10 seconds at the highest rate of flow while remaining times lay between these two time periods. In addition, the time taken for the waste liquor to move from the second addition location and exit from the tube 5 was 4 seconds at the lowest rate of flow and 1.4 seconds at the highest rate of flow and times therebetween for other rates of flow.

The waste liquor was then allowed to fall freely through air, down into an arrangement similar to and simulating the separation apparatus illustrated in FIG. 1 and including parts 11, 12, 13 and 14. As will be seen, the resin is separated with the aid of a scraper arrangement.

The tests did not include the step of returning aerated liquid back to the tubular device 5, as in the case of the illustrated embodiment.

TABLE 1

| Waste liquor flow rate m$^3$/h | PEO amount g/min | PEO amount mg/gram resin | Resin content of resin-freed waste liquor g/l | Degree of separation % |
|---|---|---|---|---|
| 2.12 | 2.06 | 3.1 | 0.11 | 99.4 |
| 3.28 | 2.62 | 2.5 | 0.14 | 99.2 |
| 4.07 | 2.62 | 2.0 | 0.26 | 98.6 |
| 4.28 | 2.64 | 2.0 | 0.10 | 99.5 |
| 5.69 | 3.42 | 1.9 | 0.53 | 97.2 |

As will be seen from the Table, surprisingly high degrees of separation were obtained in the tests, which were carried out in accordance with the ivnention. Despite the fact that the amount of polyethylene oxide added to the system was as low as 1.9 milligram for each gram of bone-dry resin present in the waste liquor, the degree of separation achieved was higher than 97%.

During these tests, the dry substance content of the separated resin was about 40%.

In accordance with the invention it is fully possible to refrain from concentrating the resin still further at this stage and to transport the resin at its present dry substance content as bulk goods to a recipient, e.g. to a location where the resin is used as a starting chemical in some manufacturing process or another, or where the resin is used as an additive in some context or another.

In this present state of concentration, however, resin is practically useless as a fuel, since the resin can mainly be considered to constitute a ballast in, e.g. a soda recovery boiler. When in this present state of concentration, the resin is also less attractive as bulk goods and base chemicals. Consequently, it is preferred in accordance with the invention to continue increasing the concentration of the resin to a dry solids content above, e.g., 90%.

As previously mentioned, this further concentration of the resin can be effected in accordance with the right side of the flow sheet illustrated in FIG. 1, i.e. from the reference numeral 15 and to the right.

A small transportable separator (centrifuge) was acquired, in order to simulate this part of the invention. A container fitted with an agitator was arranged in connection with the sparator.

Resin which had been separated from waste liquor in a pilot plant, in the aforedescribed manner, was fed to the container. The resin had a dry solids content of 35%. 0.1% of sodium hydroxide (as a solution containing about 260 g NaOH/l) calculated on the bone-dry weight of the resin was added to the waste liquor under agitation. Sodium sulphate was also added in an amount of 25%, calculated on the bone-dry weight of the resin. The resin-salt mixture then had a density of 1.17 g/cm$^3$. Sulphuric acid was then added to the mixture, so as to adjust the pH of the resin to 3. The acidified resin-salt mixture was then passed to the separator there being obtained a resin phase having a dry substance content of all of 96%. Such resin has a very high calorific value and is practically equivalent to fuel oil (geo-oil) when burned in, for instance, a soda recovery boiler.

A number of alternative procedures within the border of the invention will now be described with reference to the flow sheet illustrated in FIG. 1.

If the pH of the original resin-containing waste liquor does not lie within the pH-range of 1–7, a pH-adjusting chemical is added to bring the pH within said range. For instance, when the waste liquor derives from a washing filter located downstream of a peroxide bleaching state in, for instance, a groundwood pulp mill, a mill which produces thermomechanical pulp or a mill which produces chemithermomechanical pulp, the pH of the waste liquor will normally lie within the pH range of 7.5–9.5. In such cases, an acid should be added to the waste liquor, so as to bring the pH of the liquor to 7 or therebeneath.

Furthermore, such waste liquors will normally have a resin content of only about 1 gram per liter. In order to achieve an optimum purifying effect when making a polymer addition in accordance with the invention, the resin content of the waste liquor should be increased prior to making this addition, preferably so that the resin content of the liquor will be higher than 5 grams of resin for each liter of liquor.

In the FIG. 1 only two polymer addition locations are shown. It is fully possible, however, to increase this number. Laboratory tests indicate that the degree to which resin can be separated from the waste liquor increases with increasing numbers of polymer addition locations, i.e. when the total amount of polymer required is divided up into a large number of small quantities which are charged separately. Laboratory tests have shown that with regard to suitable waste liquor temperatures when carrying out the inventive method a slight increase in the degree of resin separation from the liquor is obtained with increasing temperature, at least within the temperature range of from 8° C. to slightly above 60° C.

In the following stage the waste liquor is subjected to a pronounced shearing and/or turbulent treatment process. The turbulent treatment of the waste liquor can be commenced as early as when the polymer is added to the waste liquor.

FIG. 1 illustrates one method of subjecting the liquor to the mentioned shearing process. The figure includes, for instance, two spillways 12 and 13, although it will be understood that more spillways may be provided and that the system may be restricted to only one spillway.

At this stage of the process, a single rectangular tank can be replaced with a plurality of circular tanks placed coaxially one within the other. For example, three such tanks may be provided. The tank of greatest height and smallest diameter is placed in the centre of the tank array. Outwardly of this centre tank there is placed a shorter tank of greater surface, while outwardly of this tank there is placed a further tank which is still shorter than the other two tanks but which has a much larger diameter than said tanks. Connected to the bottom of the centre tank is one or more pipes through which the polymer-provided waste liquor is delivered. The waste liquor is caused to pass up through the centre tank and over its circular rim, so as to fall into the next tank and subsequently to pass over the rim of this second tank and fall into the third tank. Resin agglomerates are scraped from the surface of the waste liquor in this third tank. The scraping arrangement used may be of circular configuration with obliquely positioned scrapers which force the resin agglomerates towards the periphery of the tank, whereafter the resin is removed from the tank at a suitable location thereon.

A third method of executing the aforesaid treatment process is one which involves causing waste liquor to pass from a tube arrangement similar to that illustrated in FIG. 1 down a stepped arrangement which terminates above, level with or into a tank, for instance a rectangular tank.

This stepped arrangement can be replaced with a wash-board-like arrangement.

A number of other arrangements having a similar modus operandi can also be used.

The resin scraped from the surface of the waste liquor is collected in a container of some suitable kind, where the resin is converted to a pumpable form. In order to manage disturbances in operation, it may be advantageous to transfer the resin to a buffer tank of comparatively large volume. Instead of adding the necessary inert chemical to the resin in connection with said container, as shown in FIG. 1, the resin can be pumped from the buffer tank to a soda recovery boiler, where sodium sulphate in the form of electrofilter dust is available and where the powderous chemical can be mixed-in on site prior to the resin being pumped back to the resin concentrating line shown in FIG. 1. Even when applying the invention in a sulphate mill, it is suitable to use sodium sulphate as the salting-out chemical, since this chemical is often used in such a mill as a make-up chemical. It is fully possible, however, to use any type of other salt whatsoever (inert chemical) in all applications of the inventive method.

A large number of laboratory tests have been carried out, in which parameters important to the inventive method have been studied. A number of these tests are described below, in the form of working exmaples.

EXAMPLE 1

One series of tests was carried out in which the effect of the number of organic polymer additions made to waste liquor rich in resin to a constant total polymer quantity were studied with regard to the degree to which resin was separated from the waste liquor.

A waste liquor having a pH of 5.6 was taken from a sulphite mill.

Firstly, the resin content of the waste liquor was determined. Since there is no generally accepted method within the field of measuring the resin content of different waste liquors of the type SCAN or TAPPI, an internal measuring method was worked out, this method being described below.

10–50 grams of waste liquor were weighed out. The quantity in each individual case depended upon the assumed resin content of the waste liquor. 10 grams of extracted, wet, defibrated pulp which had been dewatered by suction (20% dry content) were added to the weighed sample quantities of waste liquor. The original pulp may be a fully bleached sulphite or sulphate pulp. The sample was thinned with distilled water to a total weight of 300 grams. 45 grams of NaCl were added and the sample was acidified with acetic acid to a pH of 2.0–2.7. The mixture was stirred with a glass rod and then allowed to stand for 30 minutes. The pulp was then filtered by suction on a Büchner-funnel having a diameter of 8 cm and in which an extracted fabric piece was placed on the bottom thereof. In this way there was obtained a pulp cake having a thickness of about 12 mm.

The pulp cake was compressed with the glass rod and the filtrate was passed back a further two times. The resin in the waste liquor fastens in the extracted (i.e. original resin-free) pulp and it is on that pulp that the analysis thereafter is made. The pulp was placed in a string basket, having an extracted fabric piece placed in the bottom thereof. The beaker and the funnel were dried three times with the aid of a cotton wool ball. At the last time of drying the beaker and funnel, some drops of dichloromethane (DCM) were added to the ball of cotton wool.

The pulp cake, the cotton wool ball and the fabric pieces were dried overnight at a temperature of 40° C. The material was then packed in a distillation apparatus of the type of Soxhlet and extracted with dichloromethane (DCM) for nine hours. The sample was then subjected to vacuum treatment (rolling vaporization) until it was free from acid, which was achieved by adding acetone and rolling the sample a repeated number of times to vaporize the acid, until all acid smell had disappeared. The sample was then introduced into a small, weighed retort with the aid of Pasteur-pipette and filtered through a glass filter funnel of the type G2, roller evaporated again and then dried in a vacuum exsiccator for at least two calendar days.

$$\frac{\text{Amount of sample weighed out}}{\text{Amount of sample weighed in}} \cdot 1000 = x \text{ gram resin/liter waste liquor}$$

All resin contents of different waste liquors recited in this patent specification have been determined in the aforedescribed manner.

The waste liquor taken from the sulphite mill was found to have a resin content of 17.7 grams per liter.

The polymer solution was prepared by slurrying 1 gram of polyethene oxide=PEO having a molecular weight of about $8 \cdot 10^6$ in 50 ml of methanol ($CH_3 \cdot OH$), whereafter distilled water was added to 1000 ml while agitating the solution. The solution, which had a concentration of 0.1% with respect to PEO, was then allowed to stand and mature for two hours before being used.

Four batches were prepared from the waste liquor, each comprising 500 ml, and stored in respective beakers. The samples were heated to a temperature of 50° C. on a hot plate.

10.2 ml of polyethene oxide=PEO were added to all samples.

In the case of the reference sample, all of the PEO, i.e. 10.2 ml, was added at once while agitating the solution with the aid of a magnetic agitator (500–700 rpm). The solution was agitated for 1 minute.

During the tests, in which the invention was simulated to a certain extent, 2, 3 and ∞ additions were made.

In the first instance, the sample was first supplied with 5.1 ml PEO during agitation, which was continued for 1 minute. The remaining 5.1 ml PEO were then added and the sample further agitated for 1 minute.

In the second case the PEO was added in a similar manner, but with the difference that the charge was divided in 10.2/3=3.4 ml and that these charges were introduced to the waste liquor on three occasions at 1 minute intervals.

In the third case, 10.2 ml of PEO were added dropwise to the waste liquor, the time taken to administer the PEO being evenly distributed over a period of 1 minute and 45 seconds while continuously stirring the sample. Thus in this latter case the PEO was administered in a large number of densely following additions in small quantitites, here designated as an infinite number=∞.

In all of the tests carried out there was obtained a precipitate which contained a given quantity of the resin present in the waste liquor. The precipitate obtained was filtered off on a double cotton wool fabric in a Büchner-funnel. The precipitate was dried in a heating cabinet at 40° C. for 24 hours and analysed with the aid of infrared spectrophotometry (IR) with respect to its resin content. The precipitate contained solely resin and fibres.

Residual resin in the waste liquor or the filtrate was determined in accordance with the aforedescribed method.

It was possible with the aid of these two assays to determine the extent to which resin was removed from the waste liquor. The results obtained are set forth in Table 2 below.

TABLE 2

| Number of charges | Residual resin in the waste liquor after precipitation gram/liter | Degree of separation % |
|---|---|---|
| 1 | 2.31 | 87 |
| 2 | 0.71 | 96 |
| 3 | 0.27 | 98 |
| ∞ | 0.05 | >99 |

As will be seen from the Table a marked difference in the degree of separation was obtained between 1 addition on the one hand and the 2, 3 and ∞ additions on the other hand, this latter being one of the characteristic features of the inventive method.

EXAMPLE 2

One further series of tests was undertaken to study if the degree of separation is dependent on the amount of resin present in the waste liquor.

The waste liquor used as a basis for these tests was similar to that described above. The pH was thus 5.6.

Four batches were prepared. One batch was left entirely alone and thus contained 17.7 grams of resin per liter. Batch number two was diluted with water five times. Batch number three was diluted with water ten times and batch number four was diluted with water twenty times.

A 500 ml sample was taken from each batch and heated on a plate to 50° C. The same polyethylene oxide solution as that described above was used in these tests. Each sample was heated to 50° C. on a hot plate. PEO was added on two occasions, identical with the test described in the aforegoing with regard to the two additions of PEO. 10.2 ml of 0.1%-PEO were added to the undiluted sample. 2.04 ml were added to the sample which had been diluted five times. 1.02 ml were added to the sample which had been diluted ten times, while 0.51 ml was added to the sample which had been diluted twenty times. This means that the bone-dry polymer charge per gram of bone-dry resin was the same in all tests.

The precipitate obtained during the tests was handled in the aforedescribed manner and the residual resin in the waste liquor or the filtrate was also determined in accordance with the aforedescribed method.

The results obtained are set forth in Table 3 below.

TABLE 3

| Dilution number of time | The resin content of the waste liquor gram/liter | Residual resin content of the waste liquor after precipitation gram/liter | Degree of separation % |
| --- | --- | --- | --- |
| 0 | 17.70 | 0.88 | 95 |
| 5 | 3.54 | 1.00 | 72 |
| 10 | 1.77 | 0.94 | 47 |
| 20 | 0.88 | 0.72 | 18 |

It will be seen from the Table that the degree of separation is impaired by decreasing resin contents of the waste liquor. It has been found that there is a threshold value with respect to the resin content of the waste liquor, this threshold value lying in the vicinity of or at 5 grams of resin per liter.

We claim:

1. A method for purifying resin-containing waste liquor obtained in the manufacture of cellulose pulp,
    the resin-containing waste liquor having been removed from cellulose pulp and the pH of the waste liquor being within the pH range of 1 to 7.
    supplying a water-soluble organic polymer to the waste liquor which is in the form of a forwardly flowing liquid stream of the waste liquor, wherein the polymer is divided into portions,
    adding the thus divided portions of polymer to the forwardly flowing liquid steam of waste liquor at at least two separate and different times and locations along the direction of flow of the forwardly flowing liquid stream of waste liquor;
    subjecting the liquid stream to a shearing and/or turbulent treatment process to thereby agglomerate the resin; and
    then separating the agglomerated resin from the waste liquor.

2. A method according to claim 1, wherein the method includes carrying out at least part of the shearing and/or turbulent treatment process in the presence of air or with the aid of air.

3. A method according to claim 2, wherein said treatment process comprises (a) causing the polymer-containing waste liquor to fall freely in air downwardly into a tank for collecting the waste liquor, (b) causing the waste liquor to pass over at least one spillway immediately upstream of or in said tank for collecting the waste liquor or (c) a combination of (a) and (b).

4. A method according to any one of claims 1-3, wherein the method comprises introducing the largest portion of the polymer to the liquid stream at the first addition time and location.

5. A method according to any one of claims 1-3, wherein the total amount of polymer added is at least 1 milligram per gram of bone-dry resin in the waste liquor.

6. A method according to any one of claims 1-3, wherein at least 5 seconds passes between the first and the second polymer additions and the polymer is permitted to remain in the waste liquor for at least one second subsequent to the last polymer addition before subjecting the waste liquor to the next treatment stage.

7. A method according to any one of claims 1-3, wherein the method comprises treating the starting waste liquor so that its resin content exceeds 5 grams of bone-dry resin per liter when the resin content of said liquor is less than 5 grams of bone-dry resin per liter.

8. A method according to claim 7, wherein the treating comprises ultrafiltration of the waste liquor.

9. A method according to any one of claims 1-3, wherein the method includes separating agglomerated resin from the waste liquor by flotation by scraping agglomerated resin from the surface of a given volume of waste liquor forming a concentrate; and conducting away part of the waste liquor freed from resin.

10. A method according to any one of claims 1-3, wherein the method includes recycling a part of the waste liquor freed from resin after suppling air thereto and supplying air to the waste liquor in conjunction with the addition of said polymer.

11. A method according to any one of claims 1-3, wherein the method includes converting the resin concentrate to a pumpable form by agitation adding an inert chemical in powder form to the pumpable resin concentrate; and, subsequent to acidification, subjecting the resin concentrate to a final separation leading to a resin concentrate having a dry solids content of at least 90%.

12. A method according to claim 11, wherein the method comprises passing the resin concentrate to a boiler for combustion.

13. A method according to claim 11, wherein the resin concentrate is converted to a pumpable form by agitation and also by the addition of alkali.

14. A method according to claim 1, wherein the pH of the waste liquor is brought within the pH range of 1 to 7 by supplying a pH-adjusting chemical thereto.

* * * * *